W. J. MUNCASTER.
MEASURING INSTRUMENT.
APPLICATION FILED OCT. 28, 1912.
1,060,111.
Patented Apr. 29, 1913.
3 SHEETS—SHEET 1.
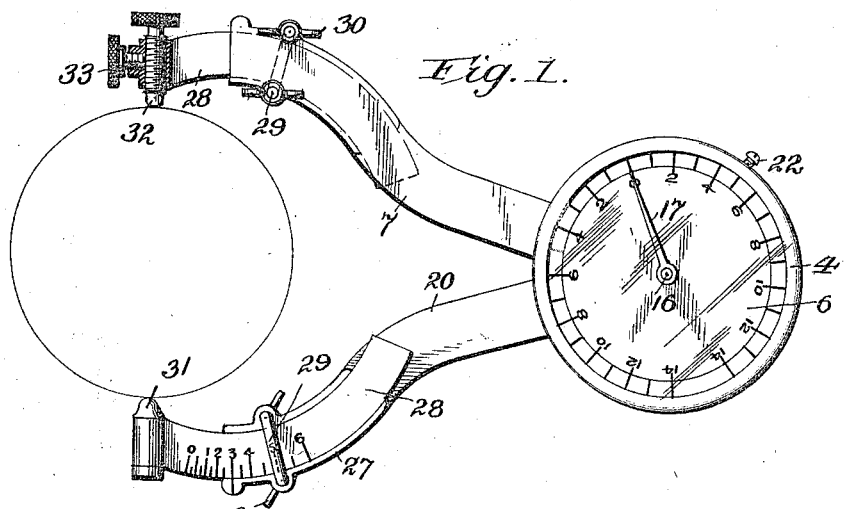
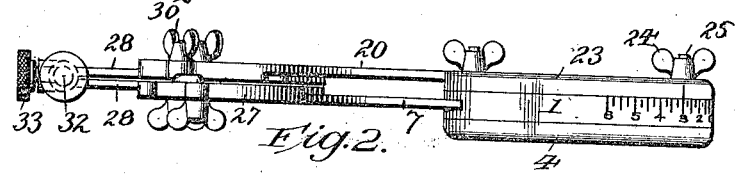
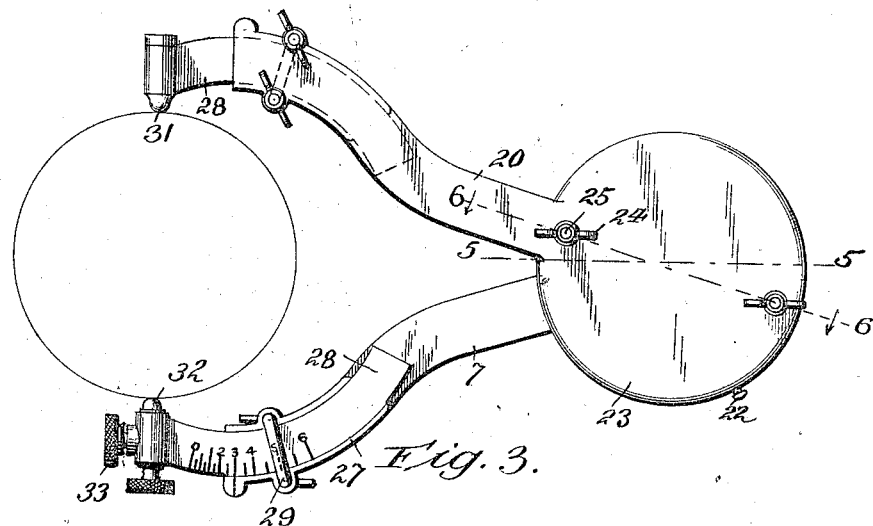
Witnesses:
Inventor:
Walter J. Muncaster,
By Dodge & Sons
Attorneys.

W. J. MUNCASTER.
MEASURING INSTRUMENT.
APPLICATION FILED OCT. 28, 1912.

1,060,111.

Patented Apr. 29, 1913.

3 SHEETS—SHEET 2.

Witnesses:

Inventor,
Walter J. Muncaster,
By Dodge & Son
Attorneys.

W. J. MUNCASTER.
MEASURING INSTRUMENT.
APPLICATION FILED OCT. 28, 1912.
1,060,111.
Patented Apr. 29, 1913.
3 SHEETS—SHEET 3.
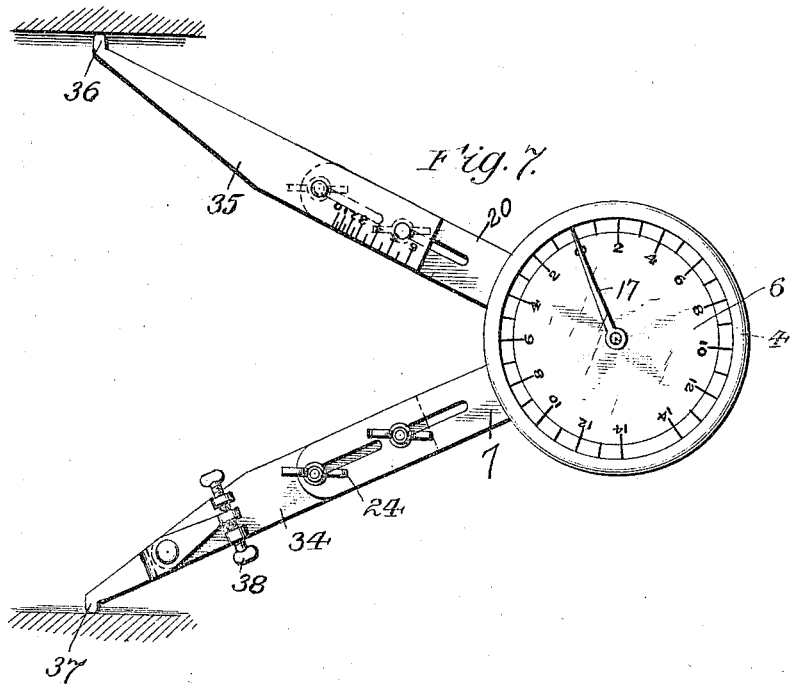
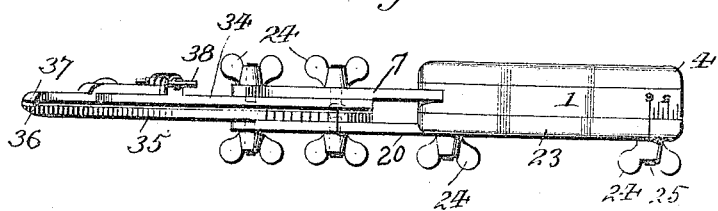

UNITED STATES PATENT OFFICE.

WALTER J. MUNCASTER, OF CUMBERLAND, MARYLAND, ASSIGNOR OF ONE-HALF TO CUMBERLAND STEEL COMPANY, OF CUMBERLAND, MARYLAND, A CORPORATION OF MARYLAND.

MEASURING INSTRUMENT.

1,060,111.  Specification of Letters Patent.  Patented Apr. 29, 1913.

Application filed October 28, 1912. Serial No. 728,167.

*To all whom it may concern:*

Be it known that I, WALTER J. MUNCASTER, a citizen of the United States, residing at Cumberland, in the county of Allegany and State of Maryland, have invented certain new and useful Improvements in Measuring Instruments, of which the following is a specification.

This invention relates to measuring instruments and provides a direct reading micrometer caliper of the pivoted leg type adapted for the measurement of a relatively wide range of diameters.

The particular field of the device is the measurement of series of objects intended all to be of a standard size to determine deviations above and below standard. For such work the range of the indicating micrometer need only be small and the device as illustrated herein is intended to measure deviations of fourteen one-thousandths of an inch (0.014 in.) above and below standard. In using my calipers the procedure is first to adjust the length of the caliper legs to correspond with the diameter to be measured, and then set the calipers to a zero reading on a standard gage.

I illustrate preferred embodiments of the invention in the accompanying drawings, in which:—

Figure 4:
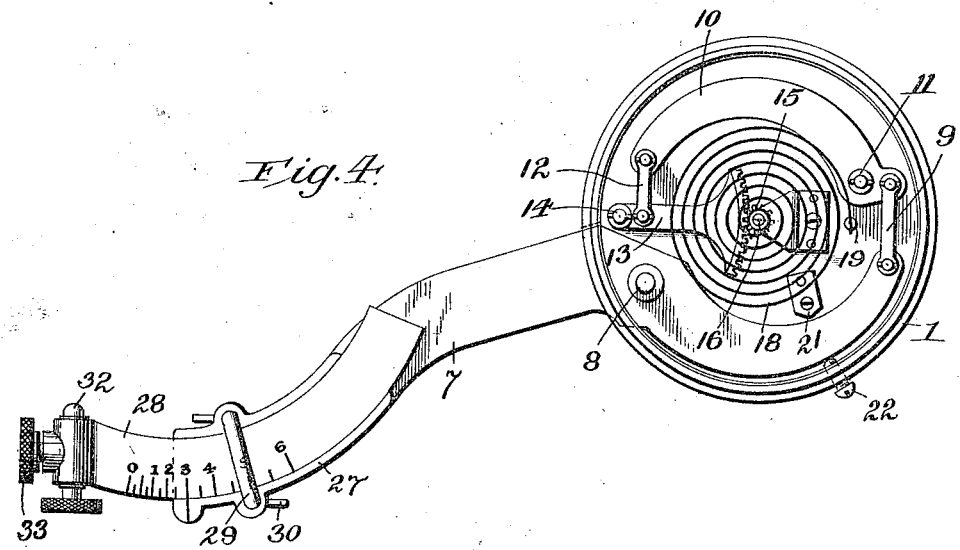
Figure 5:
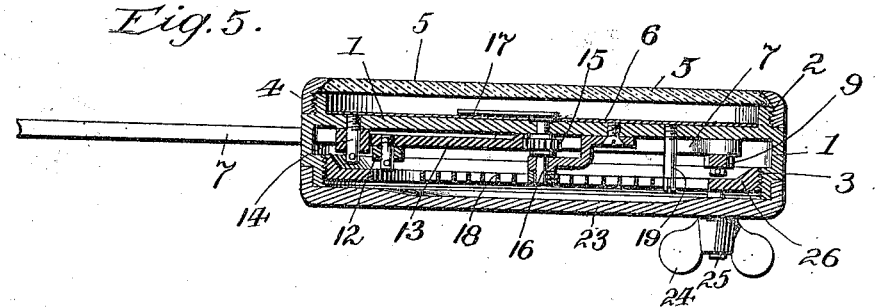
Figure 6:
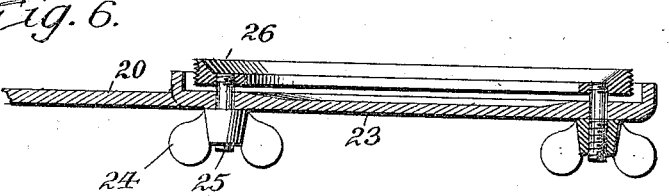

Figure 1 is a front elevation of a pair of out-side calipers embodying my invention; Fig. 2 is a side elevation of the same; Fig. 3 is a rear elevation of the same; Fig. 4 is an elevation with the rear cover plate removed; Fig. 5 is a section on the line 5—5 of Fig. 3; Fig. 6 is a section of the rear cover plate on the line 6—6 of Fig. 3; and Figs. 7 and 8 are respectively front and side elevations of an inside caliper embodying my invention.

The indicating mechanism of the caliper is carried on a supporting plate 1, provided with an externally threaded flange 2 on its front face and an internally threaded flange 3 on its rear face. On the flange 2 is screwed the bezel ring 4 which retains crystal 5 over dial 6. The dial 6 is carried on the front face of plate 1 and is suitably graduated. One leg 7 of the calipers is pivoted at 8 to plate 1 and is connected by a link 9 to the short end of lever 10. The lever 10 is pivoted at 11 and its long arm is connected by a link 12 to a gear segment 13 pivoted at 14 and meshing with a pinion 15. The pinion 15 is fast on the shaft 16 which carries the indicating hand 17. A hair spring 18 connected to shaft 16 and a stud 19 urges the leg 7 toward its companion leg 20. In the case of inside calipers the action of spring 18 is of course reversed. The motion of leg 7 is restricted by limit stops 21 and 22 to the desired range, in this case 0.028 in. The leg 20 is made integral with back cover plate 23 which turns on the outer surface of flange 3. It may be clamped in any desired angular relation with leg 7 by means of wing nuts 24 on studs 25, these studs being carried by a ring 26 in threaded engagement with the inner face of flange 3. Graduations are marked on the edge of plate 1 and an index mark is placed in back 23 as shown in Fig. 2 to aid in this adjustment.

In the case of outside calipers as shown in Figs. 1–6, each of the caliper legs 7 and 20 terminates in an arc shaped guide 27 in which is slidably mounted a curved extension 28 graduated as shown and held in adjusted position by a clamp loop 29 and wing nuts 30. A suitable index is marked on the leg to coact with the graduations in the extension. One extension 28 carries a fixed contact point 31 and the other a threaded adjustable contact point 32 which may be locked by a set-screw 33. The graduations in the leg extensions correspond to diameters for which the caliper may be set and these graduations are such as to maintain constant the altitude of a triangle whose base is the line between the contact points and whose apex is pivot 8. This gives an approximate correction for the varying angularity of the legs with different diameters. The purpose in using the curved guides and extensions is to preserve the axes of the contact points substantially normal to surfaces to be measured in the various adjustments of the caliper.

In the case of the inside calipers shown in Figs. 7 and 8, the legs 7 and 20 carry straight extensions 34 and 35 which are adjustable longitudinally on said legs and may be accurately set by means of graduations marked on them as shown. Clamp nuts 24 hold the extensions. One extension 35 has a fixed contact point 36 and the other has a pivoted contact point 37 adjustable by means of the screws 38.

The method of setting the two types of caliper are substantially identical and will be set forth with reference to the outside type. Assume that it is intended to caliper 3 inch diameters. Loosen nuts 25, turn the back plate 23 until its index reads 3 in the graduations marked on the edge of plate 1, and clamp the back plate. Adjust the extensions 28 with the 3 graduations at the index on the legs. Loosen clamp 33, screw point 32 back and apply the calipers to a standard gage. Then screw point 32 forward until hand 17 points to zero. Set up clamp 33 and the calipers are ready for use.

Having thus described my invention, what I claim is:—

1. The combination of a supporting plate; a caliper leg mounted thereon; means for angularly adjusting said leg with reference to said plate; a second caliper leg pivoted on said plate and capable of a limited angular movement relatively thereto; a multiplying indicating device connected with said plate and said second leg to indicate the relative movements thereof; longitudinally adjustable extensions mounted on each of said legs, and provided with contact points; and means for fastening said extensions in adjusted positions.

2. The combination of a supporting plate; a caliper leg mounted thereon; means for angularly adjusting said leg with reference to said plate; a second caliper leg pivoted on said plate and capable of a limited angular movement relatively thereto; a multiplying indicating device connected with said plate and said second leg to indicate the relative movements thereof; longitudinally adjustable curved extensions mounted on each of said legs, and provided with contact points; and means for fastening said extensions in adjusted positions.

3. The combination of a supporting plate; a caliper leg mounted thereon; means for angularly adjusting said leg with reference to said plate; a second caliper leg pivoted on said plate and capable of a limited angular movement relatively thereto; a multiplying indicating device connected with said plate and said second leg to indicate the relative movements thereof; longitudinally adjustable extensions mounted on each of said legs; means for fastening said extensions in adjusted positions; and contact points on said extensions, one of said points being adjustable on its extension toward the other.

4. The combination of a supporting plate; a caliper-leg mounted thereon and having a curved guide-way; means for angularly adjusting said leg with reference to said plate; a second caliper-leg pivoted on said plate, capable of a limited angular movement relatively thereto and having a curved guide-way; an indicating device connected with said plate and said second leg to indicate the relative movements thereof; curved extensions guided in the guides on each of said legs and each having a contact point; and means for fastening said extensions in adjusted positions.

5. The combination of a supporting plate; a caliper-leg mounted thereon; means for adjusting said leg angularly with reference to said plate; a second caliper-leg pivoted on said plate and capable of a limited angular movement relatively thereto; a multiplying indicating device connected with said plate and said second leg and adapted to indicate the relative movements thereof; longitudinally adjustable extensions mounted on said legs, the legs and extensions having suitable markings to indicate proper adjustments of said extensions to compensate for different angular adjustments of said second caliper-leg; and means for fastening said extensions in their adjusted positions.

6. The combination of a supporting plate; a caliper-leg adjustably mounted thereon, the plate and said leg being provided with a set of markings to indicate the angular relation of said plate and leg; means for fastening said leg and plate in their adjusted positions; a second caliper-leg pivoted to said plate; an indicating device connected with said plate and second leg and adapted to indicate the relative angular movements thereof; extensions mounted on said legs and capable of longitudinal adjustment thereon, the extensions and legs being provided with a second set of markings corresponding to the first mentioned set of markings and adapted to indicate the correct adjustment of the extensions for each angular adjustment of the plate and first leg; and means for fastening the extensions in their adjusted positions.

In testimony whereof I have signed my name to this specification in the presence of two subscribing witnesses.

WALTER J. MUNCASTER.

Witnesses:
G. J. SPEAR,
J. F. STARK.

---

Copies of this patent may be obtained for five cents each, by addressing the "Commissioner of Patents, Washington, D. C."